United States Patent [19]

Kobsa

[11] Patent Number: 5,303,275

[45] Date of Patent: Apr. 12, 1994

[54] FORCED-CIRCULATION REACTOR WITH FLUIDIC-DIODE-ENHANCED NATURAL CIRCULATION

[75] Inventor: Irvin R. Kobsa, San Jose, Calif.

[73] Assignee: General Electric Company, San Jose, Calif.

[21] Appl. No.: 894,697

[22] Filed: Jun. 5, 1992

Related U.S. Application Data

[63] Continuation-in-part of Ser. No. 716,024, Jun. 13, 1991, Pat. No. 5,120,493.

[51] Int. Cl.$^5$ .................................................. G21C 1/00
[52] U.S. Cl. ...................................... 376/352; 376/281
[58] Field of Search ....................... 376/210, 281, 352; 138/37

[56] References Cited

U.S. PATENT DOCUMENTS

| | | | |
|---|---|---|---|
| 1,329,559 | 2/1920 | Tesla | 138/37 |
| 3,386,885 | 6/1968 | Wright | 376/352 |
| 4,627,826 | 11/1986 | Cearley et al. | 376/327 |
| 4,830,053 | 5/1989 | Shaw | 376/281 |

OTHER PUBLICATIONS

Ser. No. 07/715,516: filing date Jun. 14, 1991, Inventor: Borchardt et al.

B. E. A. Jacobs and P. J. Baker, "The Cascade Diode", *Proceedings of the Third Cranfield Fluidics Conference*, Paper No. K5, British Hydromechanics Research Association, Cranfield, Bedford, United Kingdom, 1968, pp. 63–82.

E. Sher, "Theoretical and Experimental Study of the Scroll Diode Characteristics under Steady Conditions", *The Journal of Fluid Control*, vol. 12, No. 4, Debridge Publishing Co., Cupertino, Calif., Dec. 1980, pp. 57–70.

N. Syred and J. R. Tippetts, "A High Gain Active Diode—The Reverse Flow Vortex Amplifier", *Proceedings of the Sixth Cranfield Fluidics Conference*, Paper No. J4, British Hydromechanics Research Association, Cranfield, Bedford, United Kingdom, 1974, pp. 55–67.

Frank W. Paul, "Fluid Mechanics of the Momentum Flueric Diode", Proceedings of the November, 1968, *IFAC Symposium on Fluidics*, Paper A1, Peter Peregrinus Ltd., London, 1969, pp. 1–15.

*Primary Examiner*—Donald P. Walsh
*Assistant Examiner*—Frederick H. Voss
*Attorney, Agent, or Firm*—J. S. Beulick

[57] ABSTRACT

A forced-circulation boiling-water reactor includes fluidic diodes in the coolant fluid return path between the pump deck and the core inlet plenum. The fluidic diodes permit a downstream flow to proceed relatively freely, but substantially resist upstream flow. When pumps are shut down, the fluidic diodes serve to augment natural circulation, thus enhancing core stability. When the pumps are operating, the fluidic diodes serve to resist backflow, minimizing any loss of pump efficiency. This direction-flow asymmetry imposed by the fluidic diodes is achieved without moving parts, so as to achieve a high level of reliability.

9 Claims, 5 Drawing Sheets

FORCED-CIRCULATION REACTOR WITH FLUIDIC-DIODE-ENHANCED NATURAL CIRCULATION

This is a continuation-in-part of pending U.S. patent application Ser. No. 07/716,024, filed Jun. 13, 1991 now U.S. Pat. No. 5,120,493.

BACKGROUND OF THE INVENTION

The present invention relates to energy generation systems and, more particularly, to a forced-circulation dual-phase reactor. A major objective of the present invention is to provide for enhanced core neutron power stability during pump shutdowns in a forced-circulation boiling-water reactor (FCBWR).

Nuclear reactors generate heat as a byproduct of fissioning in the reactor core, and generally remove this heat from the core using a liquid transfer medium. In dual-phase reactors, the core heat vaporizes the liquid transfer medium; this energy in the form of vapor pressure is readily transferred from the reactor for use elsewhere. The predominant type of dual-phase reactor is the boiling-water reactor (BWR). Accordingly, much of the following discussion concerning BWRs is readily extrapolated to other dual-phase reactors.

In a BWR, heat generated by nuclear fission in a core can be used to boil water to produce steam. Water passing through the core without being vaporized is recirculated within a reactor vessel to provide a continuous flow of water through the core. The steam that is generated can be separated from the water and transferred from the reactor vessel to deliver energy. For example, the steam can be used to drive a turbine, which in turn can be used to drive a generator to produce electricity. In the process, the steam condenses and can be returned to the vessel as feedwater. The condensate is merged with the internally recirculated water and continues to aid heat transfer.

BWRs can be distinguished by the means employed to recirculate the water within the reactor vessel. Forced-circulation boiling-water reactors (FCBWRS) rely primarily on pumps to drive the water along a recirculation path. Natural-circulation boiling-water reactors (NCBWRS) rely primarily on the driving force provided by the density difference between a downcomer and a steam column above the core. NCBWRs have the advantage of simplicity. However, their inherently lower pumping capacity limits reactor power output. Accordingly, the largest capacity BWRs are all FCBWRS. The distinction between FCBWRs and NCBWRs notwithstanding, FCBWRs are preferably designed to take advantage of natural circulation to allow decay heat to be removed from the core in the event the pumps are shut down.

In a NCBWR, water rising up from the core is guided vertically to promote steam-water separation and to support a relatively low-density steam/water head above the core. Water recirculates down the downcomer annulus between the reactor vessel and the chimney and core. The water in the downcomer is denser than the steam and water mixture in the core and chimney region. The difference in density forces circulation up through the core and chimney and down through the downcomer.

Natural circulation provides limited power output in part because its limited circulation rates allow the water flowing through the core more time than is optimal to be converted to steam. The excess boiling results in a larger volume of steam in the core. This larger steam volume adversely affects core stability, as the stability-decay ratio of the nuclear fission rate is dependent on the ratio of two-phase pressure drop to single-phase pressure drop. In NCBWRs, this problem is addressed by limiting the amount of heat generated by the core, and thus the power output of the reactor.

FCBWRs, on the other hand, are typically designed so that they exceed the power output that would be available using natural circulation alone. Total pumping power failure in an FCBWR operating at full capacity could result in excess boiling and core instability. To minimize the likelihood of total pumping power failure, several independent pumps are provided.

Despite the levels of safety afforded by redundant pumping, it is still worthwhile to enhance the throughput due to natural circulation in a FCBWR. Natural circulation is especially attractive as a safety backup because it does not depend on active components. Thus, improvements in natural circulation are highly desirable in FCBWRs.

The above-identified patent discloses the use of bypass valves to augment natural circulation in a FCBWR. The valves are designed to open automatically when the pumps stop pumping, thereby increasing the flow cross section and enhancing natural circulation. The valves are automatically closed while the pumps are operating to block backflow through the valves. The bypass valves have moving parts, which can give rise to reliability issues. An object of the present invention is to provide the advantages that these bypass valves provide for FCBWRs without requiring moving parts.

SUMMARY OF THE INVENTION

The present invention is employed in the context of a FCBWR that promotes natural circulation when pumps are not operating. To this end, the FCBWR can include a chimney supporting a buoyancy head above a reactor core. The pumps impose a pressure differential across a boundary in a fluid circulation path. The present invention provides apertures through the boundary to enhance natural circulation induced by the buoyancy head supported by the chimney. In accordance with the present invention, these apertures are fluidic diodes that constrain backflow across the boundary when the pumps are operating. In a typical implementation of the invention, the chimney function can be provided by an appropriately designed steam-separator, and the circulation path boundary can be a pump deck.

A fluidic diode functions as a check valve except that it has no moving parts and does not completely seal. Typically, a fluidic diode includes an aperture that is relatively unobstructed during "downstream" flow. However, "upstream" flow is diverted across the aperture causing turbulence with further upstream flow. The turbulence constrains the upstream flow through the aperture.

One type of fluidic diode comprises a set of nested cylinders. Each cylinder includes a diverter that extends radially inward and downstream. The diverters guide downstream flow into a central aperture without substantial turbulence. Upstream flow is trapped between cylinders and is diverted radially inward across the aperture. The crossflow into the aperture mixes with further upstream flow inducing turbulence and thus restricting the upstream flow.

In the context of the present invention, the downstream flow that occurs with relatively low resistance is natural circulation flow; the backflow induced during pumping is the upstream flow that faces greater resistance. The fluidic diode thus approximates the effect of a check valve that admits downstream flow but prevents upstream flow. Since the fluidic diode does not completely seal, its effectiveness is less than 100%. However, a functional advantage can be attained provided the resistance to upstream backflow is at least twice that in the downstream flow during natural circulation.

A major advantage of the present invention is that core neutron power stability is enhanced in the event of a pump shutdown, without the disadvantages of moving parts that 1) can fail to move as intended, for example, a value might stick in the closed position when it should open in response to a pump trip; 2) break due to fatigue and possibly adversely impact other reactor components. Stability is improved since enhanced natural circulation decreases the ratio of the two-phase pressure drop to the one-phase pressure drop in the core. This in turn improves the stability-decay ratio of the nuclear fission rate, and thus core neutron power stability.

Since fluidic diodes contain no moving parts, they provide increased reliability. The invention is compatible with existing FCBWRs and does not require significant redesign efforts. The invention can respond automatically to pump power failures without relying on active feedback systems. Thus, the invention provides for reliable and effective response to reduction in forced recirculation. These and other features and advantages of the present invention are apparent in the following description with reference to the drawings below.

BRIEF DESCRIPTION OF THE DRAWINGS

In FIG. 4, dashed flow arrows represent natural circulation flow, while solid flow arrows represent flow during forced circulation.

DESCRIPTION OF THE PREFERRED EMBODIMENTS

Figure 1:
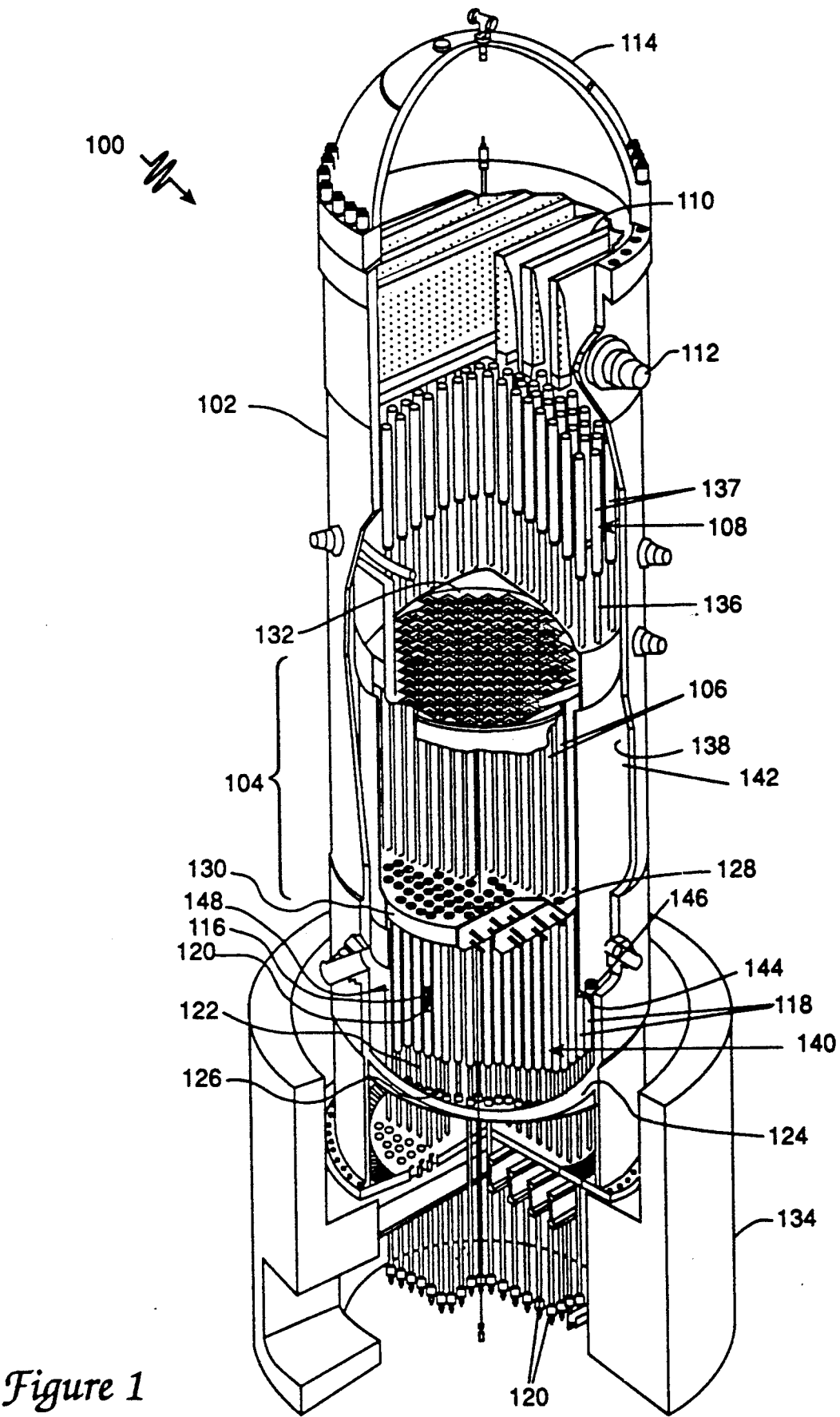
FIG. 1 is a cutaway perspective of a forced-circulation boiling-water reactor in accordance with the present invention.

In accordance with the present invention, a FCBWR system 100 comprises a reactor pressure vessel 102 and its internals, as shown in FIG. 1. Heat is generated within a core 104 of FCBWR 100, which includes fuel bundles 106 of fissionable material. Water circulated up through core 104 is at least partially converted to steam. A steam separator assembly 108 separates steam from water, which is recirculated through a fluid return path.

Steam separator assembly 108 serves as a chimney in supporting a driving head to promote natural circulation of water within vessel 102. Residual water is removed from the steam by steam dryers 110. The steam then exits reactor through a steam exit 112 near a vessel head 114.

The amount of heat generated in core 104 is regulated by inserting and withdrawing control blades 116, and by varying core flow. To the extent that a control blade 116 is inserted into core 104, it absorbs neutrons that would otherwise be available to promote the chain reaction that generates heat in core 104. Control rod guide tubes 118 below core 104 maintain the vertical motion of control blades 116 during insertion and withdrawal. Hydraulic control rod drives 120 effect the insertion and withdrawal of control blades 116. Control rod drive housings 122 extend through a bottom head 124 of vessel 102, where they are welded to stub tubes 126, which are in turn welded to vessel bottom head 124. Fuel bundles 106 are supported from below by a fuel support casting 128 mounted on a core support plate 130 located at the base of core 104. A top guide 132 helps align fuel bundles 106 as they are lowered into core 104. Vessel 102 is mounted on a concrete pedestal 134.

The recirculation path within vessel 102 is upward through core 104, upward through stand pipes 136 of separator assembly 108, upward, outward and then downward through steam separators 137 of separator assembly 108, radially outward toward a downcomer 138, downward through downcomer 138, radially inward through a core inlet plenum 140, and back up to core 104.

A shroud 142 encircles core 104 so as to define an inner radial wall of downcomer 138, isolating the fluid flowing downward through downcomer 138 from the steam/water mixture rising through core 104. Shroud 142 extends below core 104 to form a boundary between downcomer 138 and core inlet plenum 140. Shroud 142 extends down to a pump deck 144, on which ten electric pumps 146 (one shown, 6-10 are typical) are mounted. During forced circulation, the primary flow path from downcomer 138 to core inlet plenum 140 is through the inlet suction annulus of pumps 146. Shroud 142 is supported by shroud supports 148.

Figure 2:
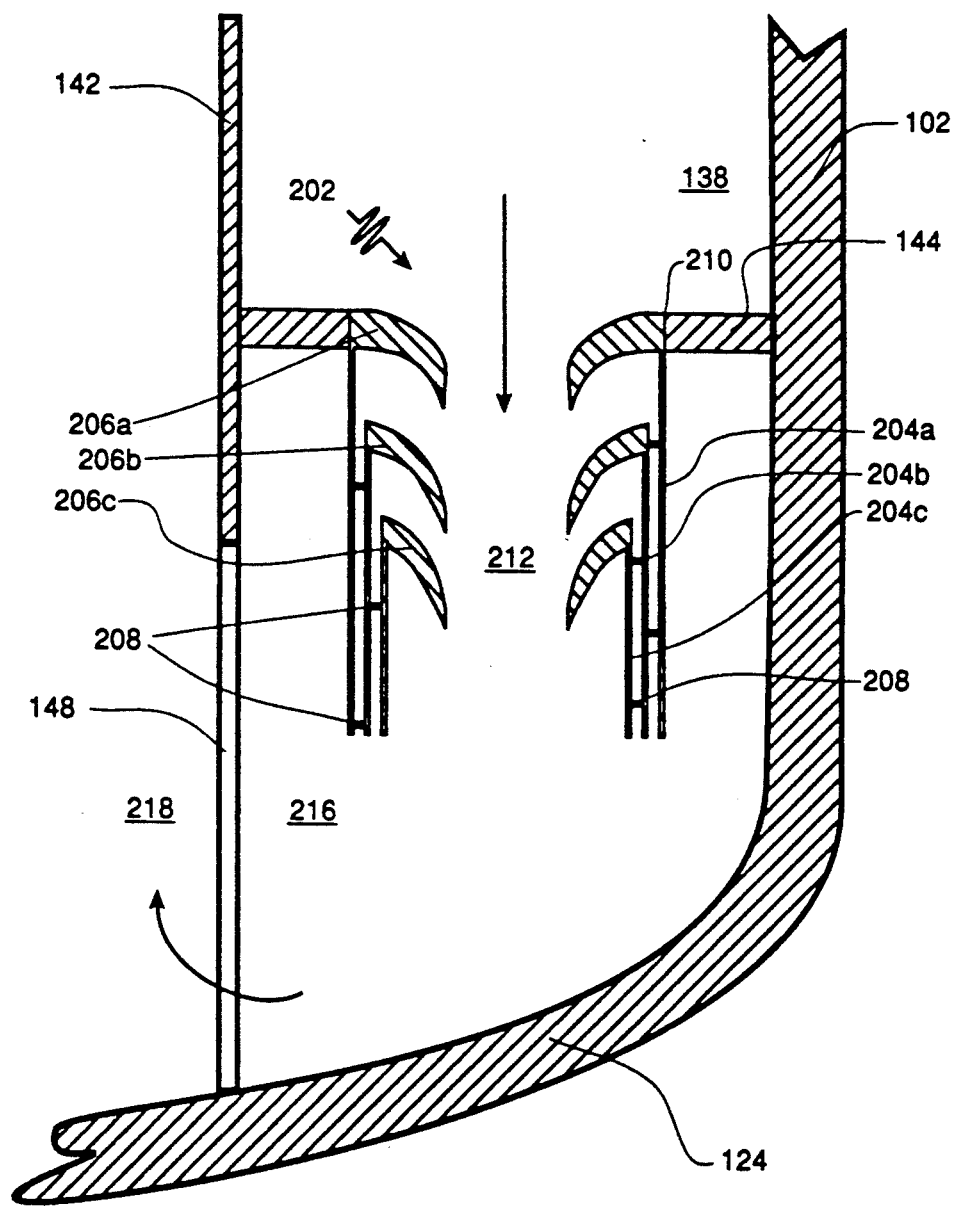
FIG. 2 is a schematic sectional view of the reactor of FIG. 1 showing one type of fluidic diode arrangement in accordance with the present invention.
Figure 3:
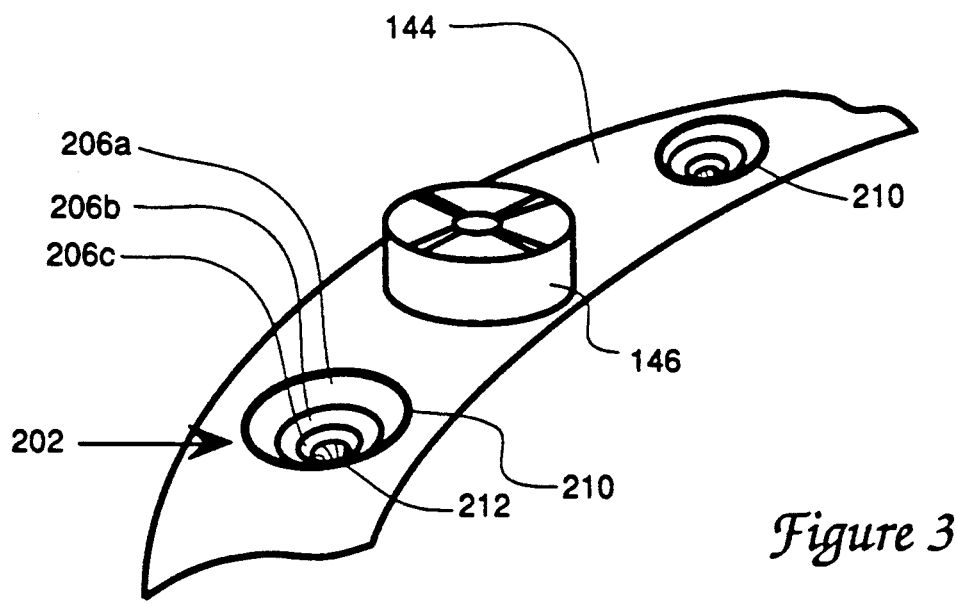
FIG. 3 is a perspective view of a portion of the reactor of FIG. 1 employing internal pumps as well as fluidic diodes in accordance with the present invention.
Figure 4:
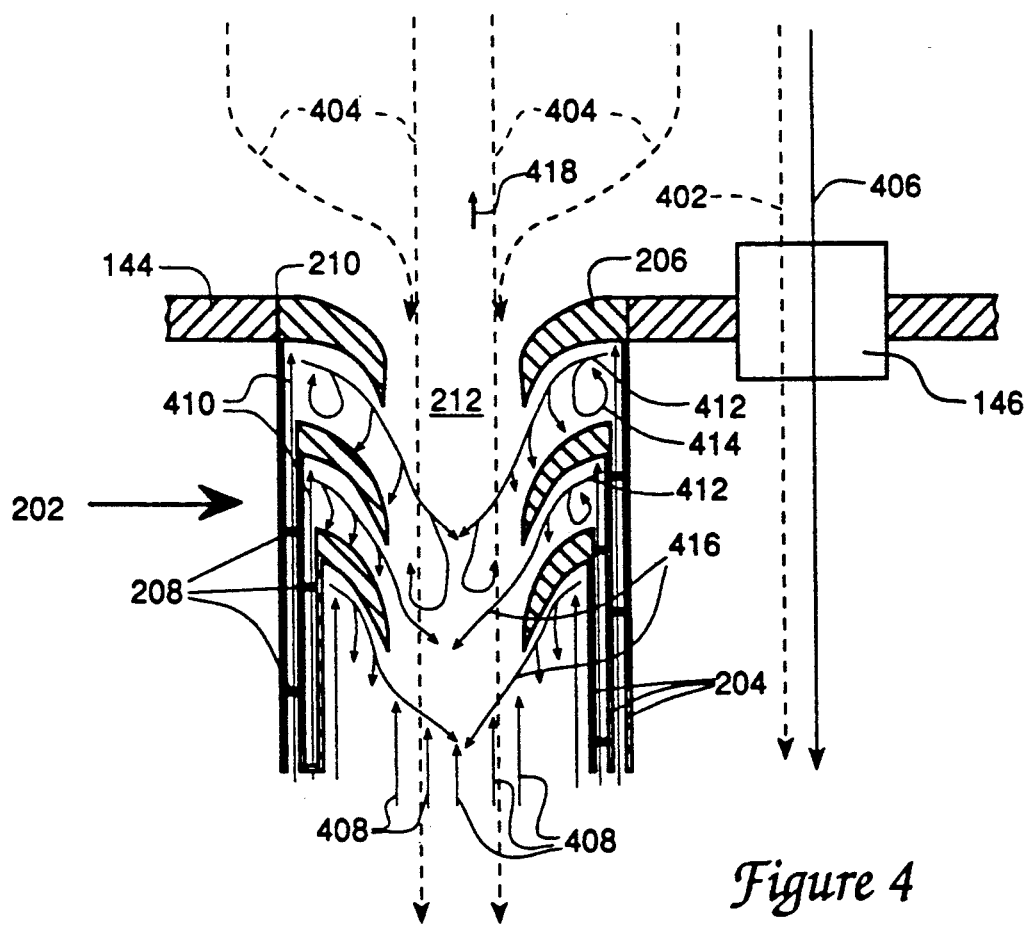
FIG. 4 is a schematic diagram of fluid flow through a pump and a fluidic diode of the reactor of FIG. 1.

In accordance with the present invention, the flow cross section between downcomer 138 and core inlet plenum 140 is augmented by natural circulation through fluidic diodes 202 (one shown in FIG. 2) when forced circulation is stopped. For each fluidic diode 202, the flow resistance in the upstream direction (counter to normal circulation flow) is at least twice the flow resistance in the downstream direction (in the normal direction of coolant flow). Each fluidic diode 202 includes radially nested cylinders 204 (shown as cylinders 204a, 204b, and 204c) that are flared inwards to define diverters 206 (including diverters 206a, 206b, and 206c), as shown in FIGS. 2, 3, and 4. Each diverter 206 is described by an elliptical radius of curvature that increases from the circumference of the cylinder toward the center of the cylinder, as shown in FIG. 2. Rib supports 208 space and support cylinders 204, as seen in FIG. 2. Ten fluidic diodes 202 are located between respective pairs of adjacent pumps 146 (as indicated in FIG. 3), and are attached by welds 210 to pump deck 144.

When pumps 146 are not operating, coolant flows downstream through pumps 146, as indicated by arrow 402 in FIG. 4. This natural circulation flow is driven by the differential pressure between downcomer 138 and the chimney action of steam separator assembly 108. However, since the flow cross section of pumps 146 is limited, they provide for only limited natural circulation. The total natural circulation flow cross section through pump deck 144 is augmented by fluidic diodes 202, each of which includes a respective central aperture 212, as shown in FIGS. 2, 3, and 4. For each fluidic diode 202, diverters 206 funnel natural circulation to the respective aperture 212, as indicated by flow arrow 404. Diverters 206 are configured to minimize the turbulence imposed on the natural circulation flow so as to impose minimal resistance to this flow.

When operating, pumps force water through pump deck 144, as indicated by flow arrow 406. The forced flow creates a positive pressure differential across pump deck 144. In other words, the fluid pressure downstream of deck 144 is greater than the fluid pressure upstream of deck 144. This positive pressure differential induces a backflow 408 toward fluidic diode apertures 212, as indicated in FIG. 4. This backflow 408, if unrestricted, would undesirably diminish the net efficiency of the forced circulation. However, much of this backflow is trapped between cylinders 204, as indicated by flow arrows 410, and then diverted radially inward and in a downstream direction by diverters 206, as indicated by flow arrows 412. The diverted backflow generates eddy currents 414 and crossflow 416 across aperture 212. Eddy currents 414 and crossflow 416 mix and interfere with backflow 408, causing turbulence that impedes backflow 408. The net backflow 418 through fluidic diode 202 is thus substantially diminished relative to what it would be through aperture 212 without the asymmetric action of fluidic diode 202.

Figure 5:
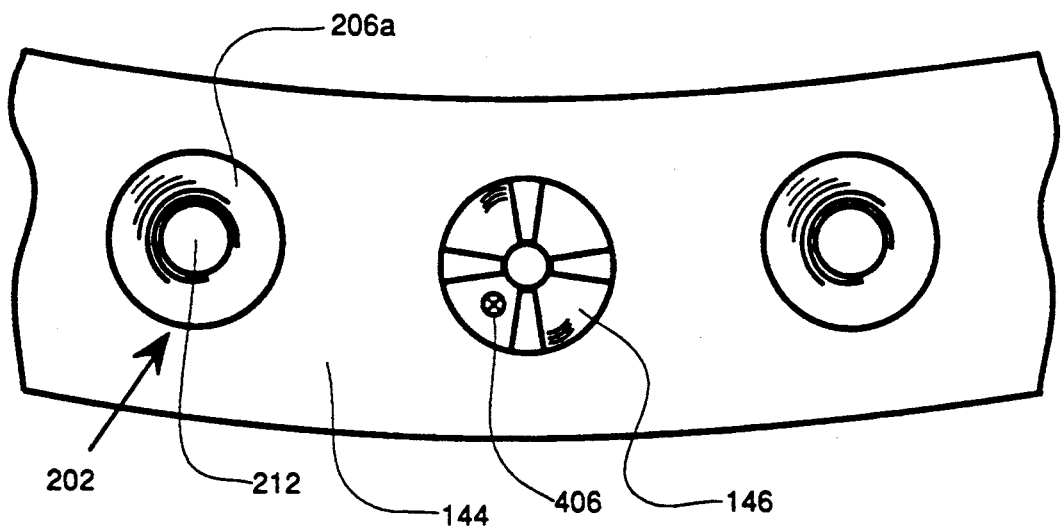
FIG. 5 is an view of a pump and fluidic diodes of FIG. 3.
Figure 6:
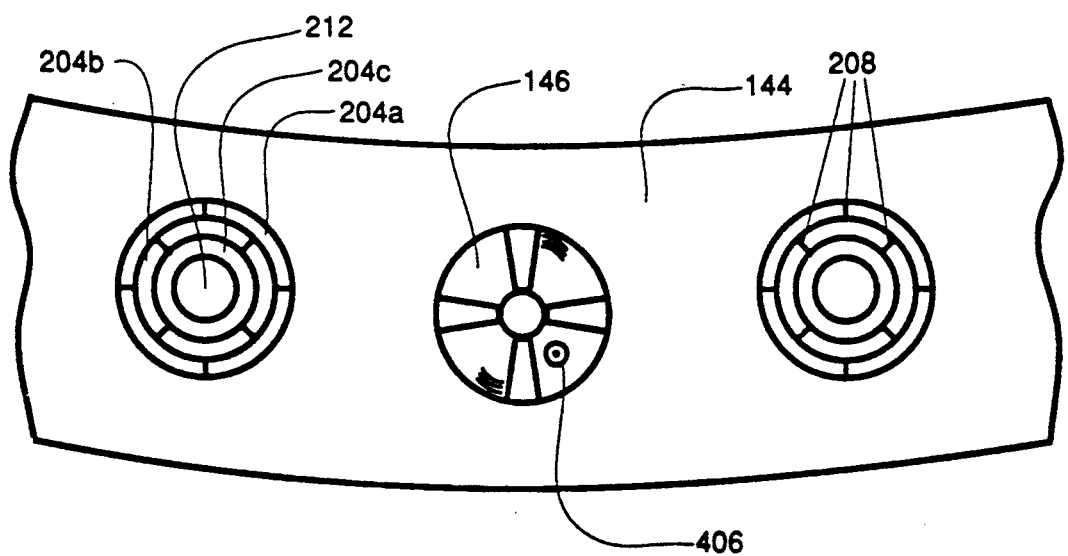
FIG. 6 is a bottom plan view of the pump and fluidic diodes of FIG. 5, particularly showing the rib supports between cylindrical sections of the diode.
Figure 7:
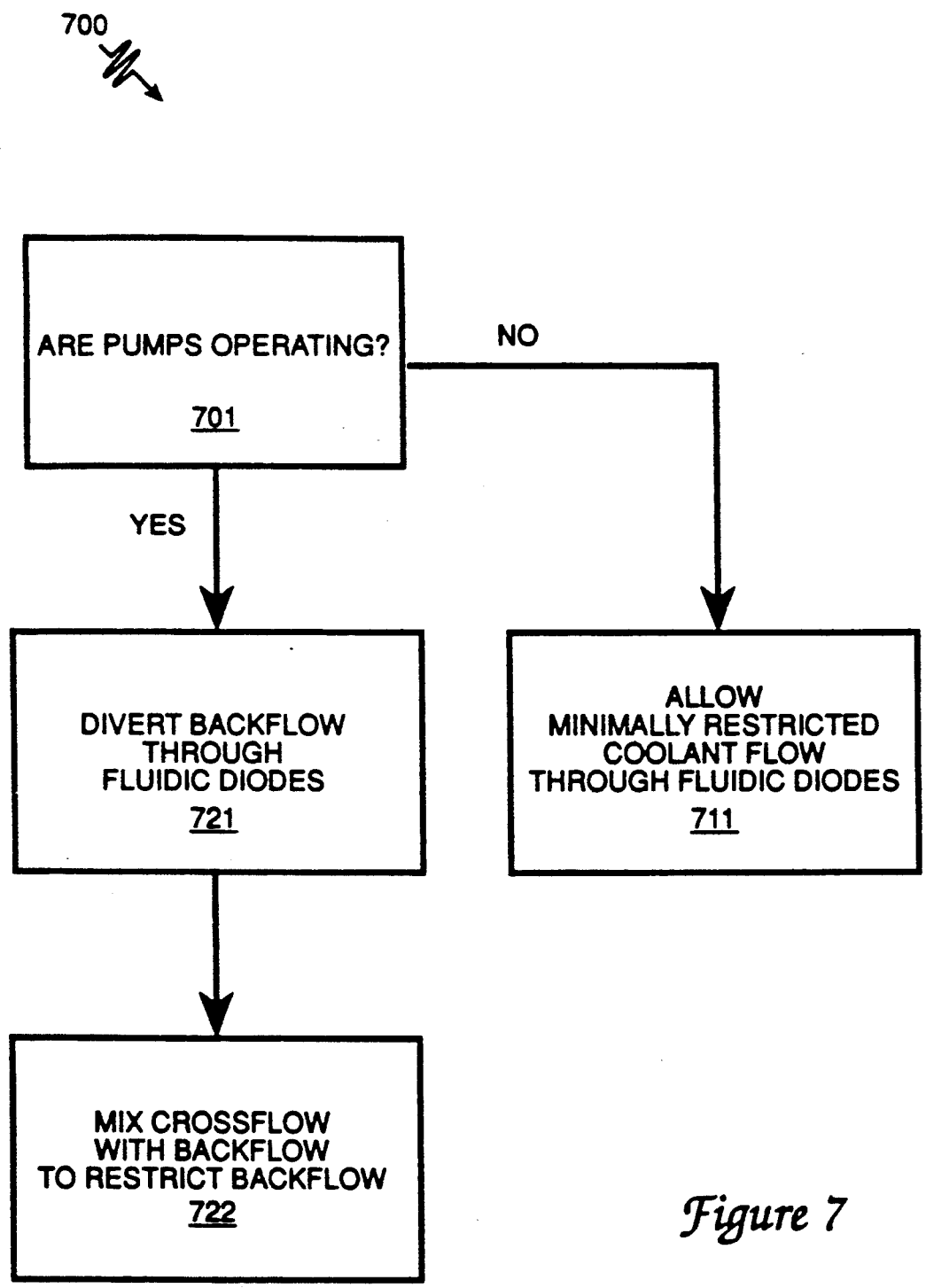
FIG. 7 is a flow chart of a method practiced in accordance with the present invention.

The distance between vessel wall 102 and shroud 142 is 26". Diverters 206 extend so that central pathway 212 has a constant diameter of 6" so that the 10 fluidic diodes 202 pass the desired amount of augmented natural circulation flow. Thus, when fluidic diode 202 is viewed from above pump deck 144, as shown in FIG. 5, only topmost diverter 206a of outer cylinder 204a is visible. Viewed from below, the concentric structure of cylinders 204 is apparent, as seen in FIG. 6. Rib supports 208 are also shown in FIG. 6.

A method 700 of the present invention includes a conditional branch step 701, depending on whether or not pumps 146 are operating. When they are not operating, fluid is permitted to flow downstream through fluidic diodes 202 with minimal resistance to augment natural circulation, at step 711. When pumps 146 are operating, backflow through fluidic diode 202 is diverted radially and downstream at step 721 to produce crossflow 416. Eddy currents 414 and crossflow 416 mix with backflow 408 at step 722, inducing turbulence and concomitant resistance to the backflow.

Those skilled in the art can recognize that other embodiments are provided for. Different fluidic diode diameters can be used depending on flow requirements and the number of fluidic diodes actually employed. The diameter of central pathway 212 need not be constant. An alternative fluidic diode has diverters arranged to narrow the backflow pathway progressively. Fluidic diodes of other design can be used. In particular, cascade diodes, Tesla diodes, scroll diodes, momentum flueric diodes, vortex diodes, and vortex amplifiers, are provided for. See, e.g., B. E. A. Jacobs and P. J. Baker, "The Cascade Diode," Proceedings of the Third Cranfield Fluidics Conference, Paper No. K5, British Hydromechanics Research Association, Cranfield, Bedford, United Kingdom, 1968, pp. 63-82; E. Sher, "Theoretical and Experimental Study of the Scroll Diode Characteristics under Steady Conditions," *The Journal of Fluid Control*, Vol. 12, No. 4, Debridge Publishing Co., Cupertino, Calif., December, 1980, pp. 57-70; N. Syred and J. R. Tippetts, "A High Gain Active Diode—The Reverse Flow Vortex Amplifier," Proceedings of the Sixth Cranfield Fluidics Conference, Paper No. J4, British Hydromechanics Research Association, Cranfield, Bedford, United Kingdom, 1974, pp. 55-67; and Frank W. Paul, "Fluid Mechanics of the Momentum Flueric Diode," Proceedings of the November, 1968, IFAC Symposium on Fluidics, Paper A1, Peter Peregrinus Ltd, London, 1969, pp. 1-15. Generally, any means that allows asymmetric flow, with low impedance in one direction and high impedance in the other, can be used to enhance natural circulation in accordance with the invention.

While the illustrated boiling-water reactor includes internal electric pumps, the present invention applies as well to reactors employing jet pumps. While the described embodiments are presented in the context of boiling-water reactors, the present invention also applies to other forced-circulation reactors capable of limited recirculation by natural circulation. Thus, dual-phase reactors other than boiling-water reactors are provided for, since such reactors have a vapor phase that can serve as a buoyancy head for natural circulation. These and other modifications to and variations upon the described embodiments are provided for by the present invention, the scope of which is limited only by the following claims.

What is claimed is:

1. A forced-circulation dual-phase reactor comprising:

a reactor vessel;

a reactor core disposed within said vessel and defining a core inlet plenum below said core;

a chimney means disposed above said core for guiding fluid exiting upward from said core along a substantially vertical path so as to support a steam/water column therein;

a fluid return path for recirculating fluid exiting said chimney means to said core inlet plenum, said fluid return path defining an upstream direction and a downstream direction;

pump means for controllably enhancing a pressure differential across a boundary in said fluid return path so as to urge fluid in said downstream direction along said fluid return path; and fluidic diode means for asymmetrically constraining fluid flow across said boundary, said fluidic diode means providing a path for at least some fluid to bypass said pump means and to pass relatively freely across said boundary in said downstream direction, said fluidic diode means relatively restricting fluid flow across said boundary in said upstream direction;

whereby, when said pump means is not operating, said fluid diode means provides relatively unrestricted natural circulation flow across said boundary, and when said pump means is operating, said fluid diode means relatively restricts backflow across said boundary.

2. A reactor as recited in claim 1 wherein the flow resistance through said fluidic diode means in said upstream direction is at least twice the flow resistance through said fluidic diode means in said downstream direction.

3. A reactor as recited in claim 1 wherein said fluidic diode means has no moving parts.

4. A reactor as recited in claim 1 wherein, when said pump means is operating, said fluid diode means relatively restricts said backflow by creating a flow-restricting turbulence.

5. A forced-circulation boiling-water reactor comprising:
- a reactor pressure vessel having a cylindrical vessel wall;
- a radioactive core for generating heat, said core being disposed within said reactor pressure vessel and defining a core inlet plenum within said vessel and below said core;
- chimney means for supporting a steam/water column;
- a cylindrical shroud extending vertically at least partially along the vertical extent of said core to a level below said core, said shroud defining a radially inward boundary of a downcomer, said vessel wall defining a radially outward boundary of said downcomer;
- recirculation pump means, including internal components disposed within said vessel, said pump means providing for a pressure differential from said downcomer to said core inlet plenum, said pressure differential being positive when said pump means is operating;
- a pump deck located at the base of said downcomer, said internal pump components being mounted on said deck, said deck and said shroud defining a downcomer/plenum boundary between said core inlet plenum and said downcomer; and
- fluidic diode means for asymmetrically constraining fluid flow, said fluidic diode means being mounted in said pump deck, said fluidic diode means allowing fluid to pass relatively freely through said pump deck in said downstream direction, said fluidic diode means restricting fluid flow through said pump deck in said upstream direction;
- whereby when said pump means is not operating, said fluidic diode means provides relatively unrestricted natural circulation flow through said pump deck, and when said pump means is operating, said fluidic diode means relatively restricts backflow through said pump deck.

6. A reactor as recited in claim 5 wherein said fluidic diode means includes plural radially nested cylinders, said cylinders having respective diverter means for diverting fluid downstream and radially inward so that
- when fluid is flowing downstream, said diverter means induce relatively little turbulence so that downstream flow is relatively unrestricted, and
- when fluid is flowing upstream, said diverter means induce relatively more turbulence so that backflow is relatively restricted.

7. A method of improving core stability in a forced-circulation dual-phase nuclear reactor comprising the steps of:
- when the pump means of said forced-circulation reactor are not operating, allowing at least some natural circulation of flow to bypass said pump means through apertures, and
- when said pump means are operating, restricting backflow through said apertures.

8. A method as recited in claim 7 wherein said step of restricting backflow involves generating turbulence across said apertures.

9. A method of improving core stability in a forced-circulation dual-phase nuclear reactor, said reactor including pumps for forcing coolant in a downstream direction across a pressure-differential boundary along a recirculation path, said method comprising the steps of:
- when pumps of said forced-circulation reactor are not operating, allowing natural circulation flow to flow in said downstream direction through apertures in said recirculation path boundary so as to impose a relatively small resistance on said natural circulation flow; and
- when said pump means are operating to force coolant across said boundary in an downstream direction so as to induce a backflow toward said pressure differential boundary,
- diverting some of said backflow to define a crossflow across said apertures; and
- mixing said crossflow with said backflow to induce turbulence that imposes a relatively large resistance on said backflow.

* * * * *